Oct. 31, 1944.  H. KOTT  2,361,549
REGISTER INDICATOR
Filed May 15, 1942
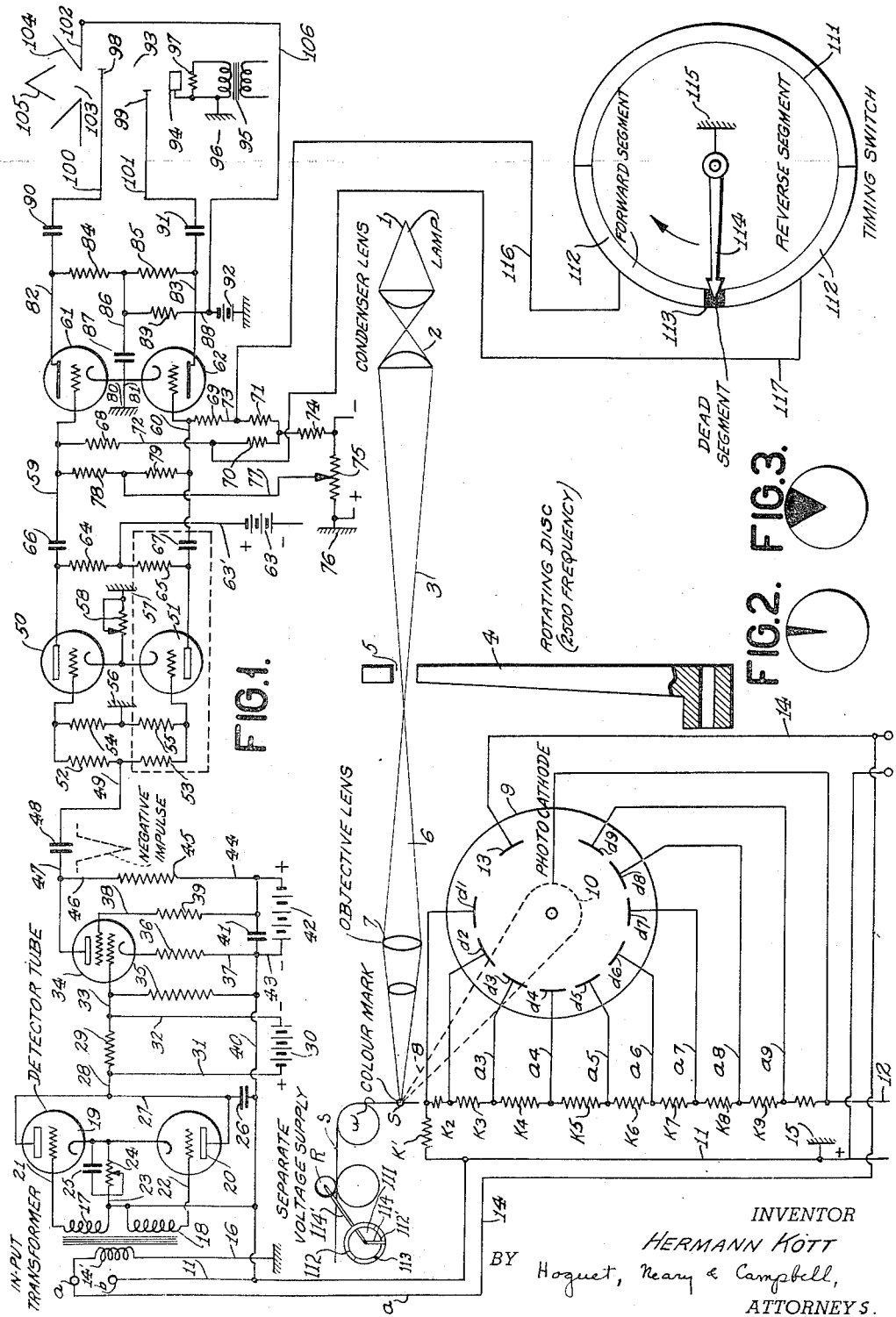

Patented Oct. 31, 1944

2,361,549

UNITED STATES PATENT OFFICE 2,361,549

REGISTER INDICATOR

Hermann Kott, West Orange, N. J., assignor to Speedy Gravure Corporation, New York, N. Y., a corporation of New York Application May 15, 1942, Serial No. 443,107

5 Claims. (Cl. 177—311)

The present invention relates to register mechanisms for rotary printing machines and the like and embodies, more specifically, an improved form of register indicator and operating system therefor by means of which the condition of register may be accurately and instantly determined.

In applicant's copending application, Serial No. 431,775, filed February 21, 1942, there is shown and described a register control mechanism for use in connection with machines such as rotary printing machines wherein a moving web is to be registered with two or more printing cylinders in order that two or more impressions may be made in register on desired portions of the web during a continuous printing operation. The system shown and described in the foregoing co-pending application employs switching tubes which normally operate at cut-off to prevent the transmission of an impulse but which are acted upon by a suitable timing switch to cause the characteristics of the switching tube to be such that it will pass an impulse received from the spot responsive mechanism on the web. As a result, the spot responsive mechanism and the timing switch are integrated to produce an electrical impulse to which an electro-responsive device is subjected.

The present invention utilizes the same integrating system of the above co-pending application but combines it with an indicator in such fashion that instantaneous and accurate indication is always given of the condition of register of the web with respect to the printing cylinders.

An object of the present invention, accordingly, is to provide a register indicator by means of which an accurate and instantaneous indication of register of a web may be provided.

A further object of the invention is to provide a register indicator system by means of which electrical impulses responsive to the spot occurrence and to cylinder rotation may be utilized to provide a continuous and accurate indication of the condition of register.

A further object of the invention is to provide, in combination with an electron ray tube, an improved form of indication representing the condition of register of a web with respect to printing cylinders, which indication serves to provide an instantaneous and accurate reflection of the condition of register of the printing machine.

Further objects of the invention will be apparent as it is described in connection with the accompanying drawing, wherein Fig. 1 is a diagrammatic illustration of a register indicator and system constructed in accordance with the present invention;

Fig. 2 is a diagrammatic illustration of an indication given by the electron ray tube indicator and indicating a condition of proper register; and Fig. 3 is a view similar to Fig. 2, showing an indication given by the electron ray tube when a typical condition of faulty register exists.

In the construction illustrated a web of material being printed is provided with spots S of a dark color, or is otherwise printed or marked at regular intervals to insure registry of a previously printed area of the web with predetermined portions of the printing rolls R to which the web is passed for further printing thereon. The present invention provides means affording a visual indication for the operator in control of the mechanism whereby he may continually observe the condition of registration. The preferred form of indicating means employed is of a type comparable to the "cat's-eye" indicator of a radio receiver. By means of an indicator of this type, the operator may thus determine at a glance the present condition of registry and may observe and check the effectiveness of the devices employed for the correction of registry by the web printing means.

Referring to Fig. 1, the control system, in combination with which the indicator is used in accordance with the present invention, is illustrated as being actuated by a photo-electric cathode ray tube 9 upon which light is directed from a web W by a beam of light 6. The light is furnished by a lamp 1 through a condenser lens system 2 and providing a beam of light 3 which is directed upon a rotating disc 4 being formed with a plurality of apertures 5. This rotating apertured disc chops up the beam of light into an intermittent beam directed to an objective lens system 7 and upon the web W in the path of occurrence of previously printed spots S. The reflected beam 8 thus falls upon the cathode 10 of tube 9 which preferably is in the nature of an electron multiplier wherein light falling upon the cathode produces cathode ray discharges that are multiplied by means of the supplemental cathodes D—1, D—2, D—3, D—4, D—5, D—6, D—7, D—8, and D—9, which are connected across resistances K—1, K—2, K—3, K—4, K—5, K—6, K—7, K—8, and K—9, respectively, the resistances being connected in circuit with wires 11 and 12 and anode 13 being connected to wire 14. The light impinging on the cathode 10 causes electrons to be emitted therefrom and these electrons in turn fall on supplemental cathode D—1 which serves to dislodge additional electrons that fall upon cathode D—2 and so on. The total number of electrons emitted from the cathodes and falling on the anode is thereby vastly increased, amplifying the current in wire 14. Wire 11 is grounded at 15 and wire 14 is connected to primary 14' of a transformer having secondary coils 17 and 18 and being grounded by means of wire 16.

The secondaries 17 and 18 are connected, respectively, to detector tubes 19 and 20 by means of wires 21 and 22, respectively. The other terminals of the secondaries are connected to the cathodes of the detector tube by means of wire 23, variable resistance 24, and condenser 25. Resistance 24 may be, for example, 10,000 ohms and the capacitance of condenser 25 may be 25 microfarads, thus providing a grid bias adjustment to enable the detector tubes to be adjusted for cut-off.

The plates of the detector tubes are connected to ground through a condenser 26, which may be of about .001 microfarad capacity and, by means of wires 27 and 28, are directed to a resistance 29 of, for example, 10,000 ohms. A separate voltage supply 30 is connected across the resistance 29 and is connected by means of wire 33 to the grid of an output amplifier tube 34. Wire 33 is connected to ground through a resistance 35 of, for example, 20,000 ohms, to serve as a low plate resistance for the detectors 19 and 20.

The filament of the output amplifier 34 is connected to ground through biasing resistance 36 and wire 37. The screen grid of the output amplifier is connected to ground through a wire 38, resistance 39, wire 40, and condenser 41. Resistance 39 may be of about 30,000 ohms. A plate voltage is supplied from a suitable source 42, which is grounded by a wire 43 and connected by a wire 44 to a resistance 45, which is connected to the plate of the amplifier by means of a wire 46. The resistance 45 may be of about 2,500 ohms and the output of the amplifier is supplied through a wire 47 to a condenser 48. From condenser 48 the current flows through a wire 49 to a phase invertor mechanism comprising tubes 50 and 51. The grids of these tubes are connected across a Wheatstone bridge arrangement of resistances 52, 53, 54, and 55, which are grounded at 56. Good results are obtained by using 10,000 ohms for resistances 52 and 53 and 250,000 ohms for resistances 54 and 55.

The filaments of the invertor tubes 50 and 51 are grounded at 57 through an adjustable resistance 58 which enables the invertor tubes to be adjusted at cut-off so that they may be set at their maximum operating current. As a result, the impulse from the amplifier causes a positive current to be produced in the output of the phase invertor. This positive current is supplied by means of wires 59 and 60 to the grids of switching tubes 61 and 62. Each of the plates of the invertor tubes 50 and 51 is connected to a source of current 63 through a wire 63', this current being about 400-volt direct current, and resistances 64 and 65 being connected between the responsive wires 59 and 60 and the said source of current. These resistances 64 and 65 are preferably of about 100,000 ohms.

Condensers 66 and 67 are connected between the output wires 59 and 60 and the plates of the invertor tubes 50 and 51 and corresponding resistances 64 and 65. Such condensers are preferably of about .005 microfarad capacity.

Switching tubes 61 and 62 are adjusted so that they are operating at about their maximum current and are at sharp cut-off. This is accomplished by means of resistances 68 and 69 for the respective tubes 61 and 62. Resistances 68 and 69 are connected to resistances 70 and 71, respectively, by wires 72 and 73, the resistances 70 and 71 being connected to a common resistance 74 which is connected to a source of high voltage 75, grounded at 76. Resistances 70 and 71 are preferably of about 500,000 ohms and resistance 74 of about 250,000 ohms, the source of current 75 being at a voltage of about 250 volts.

As long as the grids of the switching tubes have this high voltage applied to them, the tubes are inoperative to respond to the voltages impressed upon them by the tubes 50 and 51, since the switching tubes are operating at cut-off. The wires 59 and 60 are connected to the high voltage source of electricity 75 through a wire 77 and resistances 78 and 79, which are preferably of about 500,000 ohms.

The filaments of the switching tubes are grounded at 80 through a wire 81, and the plates of the tubes are connected to output wires 82 and 83, which are connected through resistances 84 and 85 to a wire 86 and condenser 87 to the wire 81 and ground 80. Wires 82 and 83 are connected to condensers 90 and 91, respectively, each being of about .005 microfarad capacity, and resistances 84 and 85 are connected to the respective wires 82 and 83, and a resistance 89 and wire 88 to a source of current 92 of about 350 volt direct current. The resistance 89 is of about 25,000 ohms, while resistances 84 and 85 are each of about 50,000 ohms.

A timing switch 111 is provided with forward and reverse conducting segments 112 and 112', respectively. The segments are separated by a dead segment 113 and a contact arm 114 moves over the segments in synchronism with the rotation of the printing cylinder, the contact arm 114 being grounded at 115 and being suitably driven either directly or by some intermediate mechanism at the printing cylinder. For example, the contact arm 114 may be connected directly to the printing roll R by means of a shaft 114'. The forward segment 112 is connected to the wire 73 by means of a wire 116, while the reverse segment is connected to wire 72 by means of a wire 117. In this fashion, the forward and reverse segments will be seen to be connected respectively to the grids of the switching tubes 62 and 61. When a spot S is in the path of the light beam 6, and the contact arm 114 is in engagement with the dead segment 113, the web is in accurate register and an impulse is not transmitted to either of the tubes 61 and 62. Thus, if the web is out of register with the printing cylinder, that is, when the spot passes beneath the beam while the contact arm 114 is out of engagement with the dead segment 113, an impulse from the phase invertor will occur while either the forward or reverse segment is grounded by the movable contact arm 114. In this condition, the appropriate switching tube is thus subject to the operating impulse of the phase invertor tube. For example, if contact arm 114 engages the forward segment 112, the grid bias current of the tube 62 is grounded and the tube no longer will be operating at cut-off. The impulse occurring under these circumstances causes the output of the tube 62 to be impressed upon the condenser 91. A corresponding operation takes place with the switching tube 61 and condenser 90 when the movable contact 114 engages the segment 112'.

The aforesaid impulses are utilized to operate an electron ray discharge tube indicated generally at 93 and consists of a cathode 94 that is energized by a transformer 95, the primary of which is connected to a 110-volt A. C. supply. The secondary is grounded at 96 and connected to the cathode 94 through a resistance 97. Grids 98 and 99 are connected, respectively, to the condensers 90 and 91 by means of wires 100 and 101.

The anode of the tube is shown at 102 and is formed with an aperture 103 above which a fluorescent screen 104 is located. A reflecting cup 105 is provided to reflect the electron rays passing through the aperture 103 upon the fluorescent screen 104 similar to the "cat's-eye" of a conventional radio receiver. The anode 102 is connected to the source of current 92 by means of a wire 106. When the circuit of the tube 93 is in tune, the grids 98 and 99 are deenergized and the line formed by the electrons, which are reflected by the cup 105 against the screen 104, is sharp, as illustrated in Fig. 2. As the circuit of the tube becomes progressively out of tune, the grids 98 and 99 are energized and the reflected beam spreads out, causing a wider wedge to be shown on the fluorescent screen 104, as illustrated in Fig. 3.

In this fashion, when the tubes 61 and 62 are operating below cut-off, as a result of a misregister of the machine, current impulses are transmitted to the respective grids 98 and 99 to throw the circuit of the tube 93 out of tune, thus causing the shape of the wedge to indicate the condition of mis-register.

From the foregoing it will be observed that a simple and effective mechanism has been provided by means of which an accurate and instantaneous indication of the condition of register may be given.

I claim:

1. In a device having means for moving a web into operating relationship with a rotatable member adapted to perform an operation upon the web in register with predetermined areas of said web, said web having registering spots thereon in predetermined relationship to said areas; the combination of means responsive to spot occurrence to generate an electrical impulse, an indicator circuit, means electrically connected with said responsive means and said indicator circuit normally preventing the impulse from being applied to said indicator circuit, means operated in synchronism with the rotatable device for rendering the preventing means inoperative to prevent the impulse from being applied to said indicator circuit only when a spot is detected in a location corresponding to misregister of said area and said rotatable device, electron discharge means having a fluorescent screen, and means in the indicator circuit to vary the character of the electron discharge of the electron discharge device whereby the visual indication of the condition of registry is provided on the screen.

2. In a device having means for moving a web into operating relationship with a rotatable member adapted to perform an operation upon the web in register with predetermined areas of said web, said web having registering spots thereon in predetermined relationship to said areas; the combination of means responsive to spot occurrence at a predetermined location to generate an electrical impulse, an indicator circuit, means normally preventing the impulse from being applied to said indicator circuit, means operated in synchronism with the rotatable device for rendering the preventing means inoperative to prevent the impulse from being applied to said indicator circuit only when a spot is detected in a location corresponding to misregister of said area and said rotatable device, electron discharge means connected to said indicator circuit having a fluorescent screen, means to direct the electron discharge to the fluorescent screen to form a visible narrow wedge when said preventing means is operative, and for increasing the size of the wedge when said preventing means is rendered inoperative.

3. In a device having means for moving a web into operating relationship with a rotatable member adapted to perform an operation upon the web in register with predetermined areas of said web, said web having registering spots thereon in predetermined relationship to said areas; the combination of means responsive to spot occurrence at a predetermined location to generate an electrical impulse, an indicator circuit, means normally preventing the impulse from being applied to said indicator circuit, means operated in synchronism with the rotatable device for rendering the preventing means inoperative to prevent the impulse from being applied to said indicator circuit only when a spot is detected in a location corresponding to misregister of said area and said rotatable device, electron discharge means connected to said indicator circuit having a fluorescent screen, means to direct the electron discharge to the fluorescent screen to form a visible narrow wedge when said preventing means is operative, and for increasing the size of the wedge upon a predetermined condition of mis-register when said preventing means is rendered inoperative.

4. In a device having means for moving a web into operating relationship with a rotatable member adapted to perform an operation upon the web in register with predetermined areas of a web, said web having registering spots thereon in predetermined relationship to said areas; the combination of means for detecting the presence and absence of said registering spots on said web and generating current impulses upon detection of said spots, an electron discharge device having a fluorescent screen, said device providing a visual indication of one character upon energization by current impulses and a visual indication of a different character in the absence of current impulses, means electrically connected to said detecting means and said electron discharge device normally blocking passage of current impulses from said detecting means to said electron discharge means, and means operated in synchronism with said rotatable member for rendering said impulse blocking means ineffective to block passage of said impulses to said electron discharge means when said areas are out of register with said rotatable member, and for allowing normal operation of said blocking means when said areas are in register with said rotatable member.

5. In a device having means for moving a web into operating relationship with a rotatable member adapted to perform an operation upon the web in register with predetermined areas of a web, said web having registering spots thereon in predetermined relationship to said areas; the combination of means for directing a light beam onto said web, means responsive to interception of said beam by a spot for generating a current impulse, an indicator circuit including an electron discharge device having a fluorescent screen and means in the indicator circuit providing an electron discharge from said electron discharge device of one character visible on said screen in response to said current impulses, and a different character of discharge visible on said screen in the absence of current impulses, electrical means connected to said impulse generating means and said indicator circuit for blocking passage of said impulses to said electron discharge device, and means operated in synchronism with said rotatable means for rendering said electrical means ineffective to block the passage of said impulses when said areas are out of register with said rotatable means and effective to block the passage of said impulses when said areas are in register with said rotatable means.

HERMANN KOTT.